Inventor
REMY BAUD
By
Holcombe, Wetherill & Brisebois
Attorneys

May 7, 1968 R. BAUD 3,382,499

DUAL SIGNAL RECEIVING SYSTEM

Filed May 20, 1966 6 Sheets-Sheet 2

Inventor

REMY BAUD

By

Holcombe, Wetherill & Brisebois

Attorneys

Inventor
REMY BAUD
By
Holcombe, Wetherill + Brisebois
Attorneys

Inventor
REMY BAUD
By
Holcombe, Wetherill & Brisebois
Attorneys

Inventor
REMY BAUD
By
Holcombe, Wetherill & Brisebois
Attorneys

Inventor
REMY BAUD
By
Holcombe, Wetherill & Brisebois
Attorneys

United States Patent Office 3,382,499
Patented May 7, 1968

3,382,499
DUAL SIGNAL RECEIVING SYSTEM

Rémy Baud, Cheviron, France, assignor to Compagnie Francaise Thomson Houston-Hotchkiss Brandt, Paris, France, a corporation of France Filed May 20, 1966, Ser. No. 551,678
Claims priority, application France, May 21, 1965, 17,890
10 Claims. (Cl. 343—113)

ABSTRACT OF THE DISCLOSURE

Two phase displaced signals subject to erratic frequency shift are "differentially heterodyned" and commonly amplified. A variable frequency oscillator produces a signal having a component locked in frequency and phase with the erratic frequency shift. This signal is mixed with the amplifier output to eliminaate the erratic frequency shift before demodulation and phase comparison.

In communication systems, it is often necessary to process simultaneously two received signals at a common carrier frequency, e.g. in order to compare their phase.

An important class of systems in which this need arises, and to which this invention chiefly relates, is that of radio interferometric systems.

In a radio-interferometer, a radio signal transmitted from a target to be tracked, such as an artificial satellite or spacecraft, is received at a ground station by means of two fixed antennas spaced a known distance apart in a known direction. Because of the spatial separation of the receiving antennas, the two received signals are mutually phase displaced, and their phase displacement is a known function of the angle formed between the direction of the target and the direction on which the receiving antennas are aligned. By providing two such pairs of spaced antennas aligned along two different directions at the ground station, e.g. along the diagonals of a square, and determining the respective phase shifts present between the signals received by way of the respective pairs of antennas, it is therefore possible to derive two angular coordinates that completely determine the direction of the target.

A comparable situation arises in radar work, specifically in monopulse radar receivers.

In systems of the general type described, processing the two signals in separate channels, as for amplification and demodulation, has been found undesirable. The electronic components in the two channels, even if they possess identical characteristics originally, age differently and their circuit parameters drift apart with time. Serious causes of error are thus introduced. In a known type of radio-interferometer used for satellite tracking, the following expedient has been used to overcome the difficulty.

The two phase-displaced received signals, at a common nominal carrier frequency, are each passed through a frequency conversion stage in which their equal frequencies are changed to two respective frequencies differing by a small, fixed, amount, while their initial phase displacement—the quantity to be measured—is preserved. The two frequency-converted signals are combined into a single composite signal which is passed through a common processing channel. In this common channel the composite signal is amplified and then passed through a suitable detecting or demodulating arrangement in which the two components of the composite signal can be resolved and demodulated owing to the small differential frequency displacement between them. Thus, the expedient just described, which can be termed "differential heterodyning," enables a common amplifier channel to be used and thus eliminates the problems of differential drift of circuit characteristics that inevitably accompany the use of two separate signal processing channels.

Radio-interferometer (as well as monopulse radar) systems utilizing the single-channel concept just described have proved a considerable improvement over earlier systems. The improved systems, however, have still suffered from a serious drawback. Filtering means are required at various points of the signal channel, especially in association with the demodulating device, for the elimination of adventitious frequencies introduced in the processing of the composite signal. Now, it would be eminently desirable that all such filters should have an extremely narrow passband, since the narrower the spectrum of frequencies passed, the greater will be the proportion of noise and disturbance signals that can be eliminated, and the sensitivity and range capability of the system will be correspondingly increased. This requirement is especially important in the case of the weak signals received from far-off satellites and spacecraft that are exposed to many forms of disturbance from atmospheric, radiational and other sources.

This narrow-band requirement, however, is difficult or impossible to meet in the case of transmitters moving with the very high velocities that characterize the type of target just referred to, because of the large Doppler frequency shifts caused by the radial component of target velocity. Since this Doppler shift is variable and not accurately predictable during tracking operations (a major function of which is to chart a satellite's orbit and therefore to determine the satellite's velocity components at each point of its trajectory), it cannot be taken into account when determining the passband characteristics of the filters and other transfer components of the system. In other words, the erractic Doppler frequency shift introduces a "frequency spread" as a result of which the effective, or apparent, frequency band of the useful signal is considerably increased, requiring the passband characteristics of the system components to be correspondingly broadened. This, as explained above, reduces the sensitivity and range of the system.

Besides the Doppler shift affecting transmitters carried aboard fast moving targets, there are various other sources of erratic, unpredictable frequency shifts in the case of signals received from remote transmitters, which have a similar damaging effect on receiver sensitivity and range. One such further cause is the frequency drift of the transmitter itself.

It is an object of the invention to improve the performance of systems of the described class, and more specifically to enhance the sensitivity and extend the operating range of such systems by permitting the spectral width or bandpass characteristics of the system components to be greatly reduced over what was required in the past.

In accordance with an important aspect, the invention provides a frequency shift-eliminating device interposed in the path of the received signals, ahead of the demodulating means. The device includes a variable-frequency oscillator controlled by means of a phase-lock circuit to deliver a signal that includes a component that is locked in frequency and phase with the erratic frequency shift that is to be eliminated, and mixer means connected in the signal path ahead of the demodulating means and receiving the oscillator output whereby to eliminate said erratic frequency shift prior to demodulation of the components of the composite signal.

In a preferred embodiment of the invention, the phase-lock circuit including the variable-frequency oscillator is of the type disclosed in the co-pending application Ser. No. 550,452 filed May 16, 1966, which comprises a composite feedback loop including a digital integrating network.

The elimination of the frequency spread in a dual signal processing system, such as a radio-interferometer system, according to the invention, has a further important advantage in addition to that of narrowing the spectral band of the signals passed through the system. It becomes possible to use as the demodulating signal in the demodulator device of the system, a locally produced signal whose frequency is the arithmetic means of the frequencies, and whose phase is subtsantially the arithmetic mean of the phases of the component signals to be demodulated. A demodulating signal having these characteristics is sometimes described as a "fictive carrier" signal, because its characteristics are identical with those of the carrier signal of a hypothetical amplitude-modulated signal having the two signal components to be demodulated as sidebands thereof. Such fictive carrier demodulation technique has important advantages that will be later pointed out. The method, however, is only practicable in the case of signals that are strictly of fixed frequency. The frequency spread eliminator device of the invention, in that it renders the frequencies of the component signals fixed and unchanging regardless of variations in Doppler shift and other causes, now makes it possible to include the "fictive carrier demodulation" feature in the radio-interferometer and other systems constructed according to the invention.

Exemplary embodiments of the invention will now be described with reference to the accompanying drawings, wherein.

Figure 1:
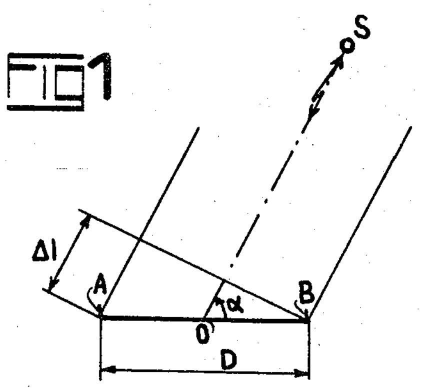
FIG. 1 is a diagram illustrating the principle of radio-interferometry.

The well-known principle of radio-interferometry will first be recalled with reference to FIG. 1. The diagram shows two receiver antennas A and B fixedly mounted at a ground station and spaced a distance D apart in a predetermined direction. A moving source of radio signals, such as a satellite being tracked, is shown at S. Angle $\alpha$ is the angle formed between the direction of alignment of the antennas AB and the direction OS of the satellite as projected on the vertical plane determined by the antennas, O being the midpoint of the segment AB. The difference in propagation distance for a common radio signal emanating from source S, in order to reach the two antennas A and B, is seen from the diagram to be $\Delta l = D \cos \alpha$. This difference in propagation distance causes the signal received at anntenna A to be phase displaced with respect to the same signal received at antenna B, by a phase angle $$\theta = 2\pi \frac{\Delta l}{\lambda}$$

where $\lambda$ is the wavelength of the signal. Hence, the phase displacement $\theta$ is related to the angular direction coordinate $\alpha$ by the equation $$\theta = 2\pi \frac{D}{\lambda} \cos \alpha$$

By measuring the phase displacement $\theta$, therefore, the angular coordinate $\alpha$ can be determined. A second angular coordinate for the satellite direction can be determined in an exactly similar way using another pair of spaced receiving antennas (not shown) aligned on a direction differing from AB, the two pairs of antennas being usually arranged at the apices of a horizontal square array.

Thus, the tracking of an artificial satellite or other fast-moving and remote object carrying a radio transmitter, is seen to involve the continuous measurement of two phase displacements present between respective pairs of signals. The difficulty of the operation stems from the weakness of the signals, the many sources of disturbance and noise liable to affect the signals during propagation from the remote transmitter, and particularly the erratic variations in the frequency of the signals. These erratic frequency variations, herein termed frequency spread, are primarily due to the Doppler shift caused by the large and variable radial components of target velocity, and also, generally to a somewhat lesser extent, due to frequency drift of the satellite transmitter. The radio-interferometer system of the invention, now to be described, eliminates the effects of frequency spread whether due to the above or any other causes, and thereby greatly enhances the sensitivity, and range capability, of the tracking system.

Figure 2:
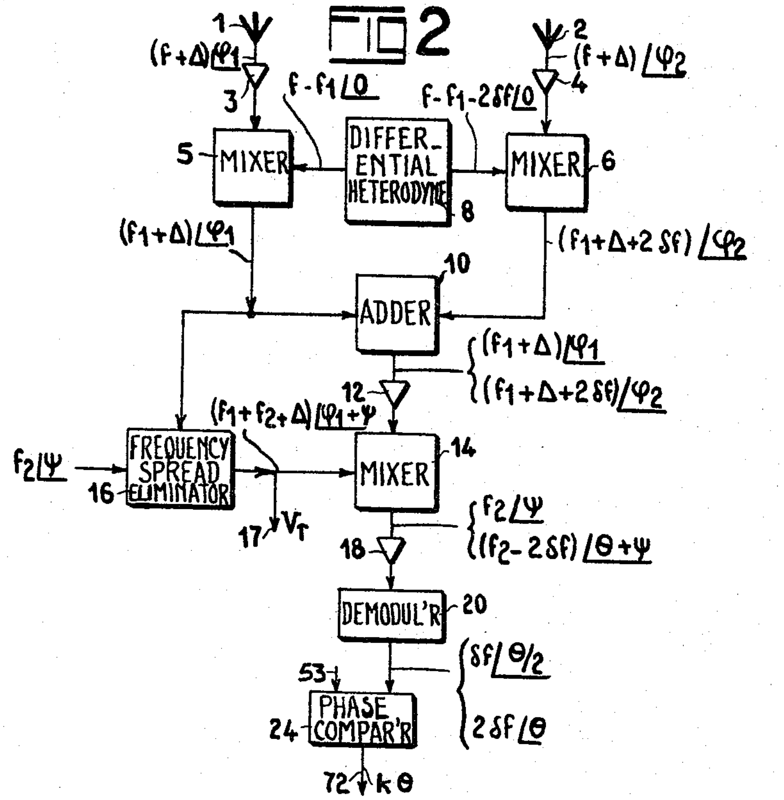
FIG. 2 is a general functional diagram of a radio-interferometer system according to the invention.

In the system shown in FIG. 2, two associate antennas (such as those designated A and B in FIG. 1), are illustrated at 1 and 2. Both antennas receive a common transmitted signal having a nominal carrier frequency $f$, the signals as received at the antennas further including the erratic frequency spread defined above, and here designated $\Delta$, so that the common frequency of the two received signals can be represented as $(f+\Delta)$, since the frequency spread $\Delta$ affects the signals received at both antennas in a substantially identical manner. The received signals have different phases, $\varphi_1$ and $\varphi_2$, and the phase displacement $\varphi_1 - \varphi_2 = \theta$, which is a function of target direction, constitutes the quantity to be accurately determined by the system.

The following notation is used to describe the various alternating signals involved in the system. A signal of frequency $f$ and phase angle $\varphi$ (as referred to a fixed phase reference of the system) is designated as the signal $f \angle \varphi$. With this notation, therefore, the signals received by antennas 1 and 2 are respectively designated as $(f+\Delta) \angle \varphi_1$ and $(f+\Delta) \angle \varphi_2$, wherein $\varphi_1 - \varphi_2 = \theta$.

The received signals, after amplification in amplifiers 3 and 4 respectively, are applied to the first inputs of respective mixers 5 and 6 to be there subjected to a first frequency conversion step. This is a differential frequency conversion or heterodyning whose purpose it is to convert the respective signals to intermediate frequencies differing by a small fixed incremental amount, while preserving the original phase relationship between the signals. Mixer 5 receives at its its second input, from a first output of a so-called differential heterodyne circuit 8 (later described), a signal $(f-f_1) \angle 0$, so that mixer 5 delivers a first I–F signal $(f_1+\Delta) \angle \varphi_1$. Similarly, mixer 6 receives at its second input from a second output of the differential heterodyne 8, a signal $(f-f_1-2\delta f) \angle 0$, where $\delta f$ represents a small fixed frequency increment, and mixer 6 therefore delivers a second I–F signal $(f_1+\Delta+2\delta f) \angle \varphi_2$.

By way of example, the frequency $f_1$ may be 3000 c.p.s. and the increment $2\delta f$ may be 200 c.p.s. so that the second heterodyning frequency is ($f$–3200) c.p.s.

The I–F signals from mixers 5 and 6 are applied to the inputs of an adder circuit 10 which may be of any suitable kind capable of delivering an output in the form of a composite signal comprising both the frequency- and phase-displaced signals applied to its inputs, as components thereof. This composite signal is then passed through a common narrow-band amplifier 12.

As earlier indicated, the just-described sequence of steps including the differential heterodyning of the signals, their combining into a composite signal and passing this composite signal through a common amplifier, is per se conventional. Its advantage lies in the avoidance of the unpredictable unequal phase shifts that would inevitably be introduced into the respective signals were they to be passed through separate channel amplifiers. In the system here shown, the distinct component signals are necessarily subjected to identical phase disturbances through the common amplifier 12 so that their original phase relationship is fully preserved and a serious source of error is thus avoided.

In the conventional single-channel interferometer system just referred to, the amplified composite signal from common amplifier 12 would, usually, be immediately passed to a detection or demodulation stage in order to convert the composite signal into a single signal of a frequency equalling the difference of the frequencies of the components of the composite signal, i.e. $2\delta f$, and a phase condition corresponding to the phase displacement, $\varphi_1-\varphi_2=\theta$. In accordance with the present invention, it has been recognized that when this conventional procedure is followed, a serious source of error is present due to the erratic frequency shift or spread, above called $\Delta$, present in both said component signals.

While it is true that the random shift $\Delta$ affects both the components identically and would therefore be eliminated of its own accord in the detector stage, the variable character of said shift makes it necessary to increase the frequency band of the detection channel in order to make allowance for the full range of possible variations thereof. Broadening the passband of the filters in the detection channel in this way has imposed a serious limitation on the attainable accuracy and sensitivity of the system. As earlier indicated the frequency spread $\Delta$ is for the most part due to the Doppler shift caused by the radial velocity of the target, and where the target is an artificial satellite or spacecraft the Doppler shift, in the case of a transmission frequency $f=136$ megacycles, can exceed $\pm 3000$ c.p.s. The variable frequency shift $\Delta$ will further include a component due to frequency drift of the satellite transmitter, say an additional $\pm 2000$ c.p.s. It is therefore seen that the conventional systems referred to must make allowance for a $\pm 5000$ c.p.s. broadening of the passband of the system, over what would be required in the absence of the frequency spread $\Delta$. Such a broadening of the passband imposes a definite threshold of reception for the signals, with a received signal/noise ratio that must be greater than unity. The tracking range of the system is correspondingly limited.

In accordance with an important feature of the present invention, the frequency spread $\Delta$ present in both received signals is eliminated prior to detection, so that the frequency of the signals becomes fixed, and the requisite passband is narrowed down to a minimum. For this purpose, the composite signal from amplifier 12 is applied to one input of a mixer 14, which receives at its second input a signal $$(f_1+f_2+\Delta)\underline{/\varphi_1+\psi)}$$

from a frequency-spread-elimination circuit 16, later described. In the above expression, $f_2$ is the frequency and $\psi$ is the phase, of an auxiliary signal applied to circuit 16 as will be presently described. Thus, mixer 14 delivers at its output a composite signal having the two components $$\begin{cases} f_2\angle\psi \\ (f_2-2\delta f)\underline{/\theta+\psi} \end{cases}$$

It is seen that these signals, like the signals from adder 10, differ in phase by the quantity $\theta$ to be measured. Unlike the signals from adder 10, however, the component signals delivered by mixer 14 are of fixed frequencies ($f_2$ and $f_2-2\delta f$ respectively), and are free from the frequency spread that affected the signals at the output of adder 10. The composite signal from mixer 14, of the form given above, is amplified in amplifier 18 and applied to the detector circuit 20. Circuit 20 is a so-called fictive-carrier demodulator circuit that will be later described in detail. In it, the composite signal is mixed with two signals, phase-displaced 90° with respect to each other, at a frequency $(f_1-\delta f)$ which is the mid-frequency of the two components of the composite signal. This mid-frequency can be regarded as the frequency of a fictive, amplitude-modulated carrier wave having the two composite signal components at the frequencies $f_2$ and $(f_2-2\delta f)$, as "sidebands." After mixing or demodulation with the two 90°-displaced fictive carrier signals, the composite signals are combined into a single output signal of the frequency $2\delta f$ (or $\delta f$) and the phase $\theta$ (or $\theta/2$), the details of this demodulating-and-combining operation in the demodulator 20 being described later.

The output signal $2\delta f\angle\theta$ (or $\delta f\angle\theta/2$) from demodulator circuit 20, is applied to one input of a phase comparator circuit 24. This circuit receives at its second input a reference signal $2\delta f\angle 0$ (or $\delta f\angle 0$), which may conveniently be derived from the differential heterodyning circuit 8, as later described. The phase comparator circuit 24 operates in a manner later disclosed to measure the phase or time displacement between the two low-frequency signals applied to its inputs, and delivers an output signal proportional to said displacement, that is the phase displacement $\theta$ between the received radio signals, as a highly accurate measure of the target direction.

Certain important components of the system, schematically shown in FIG. 2 and briefly referred to in the above description, will now be described in greater detail.

Figure 3:
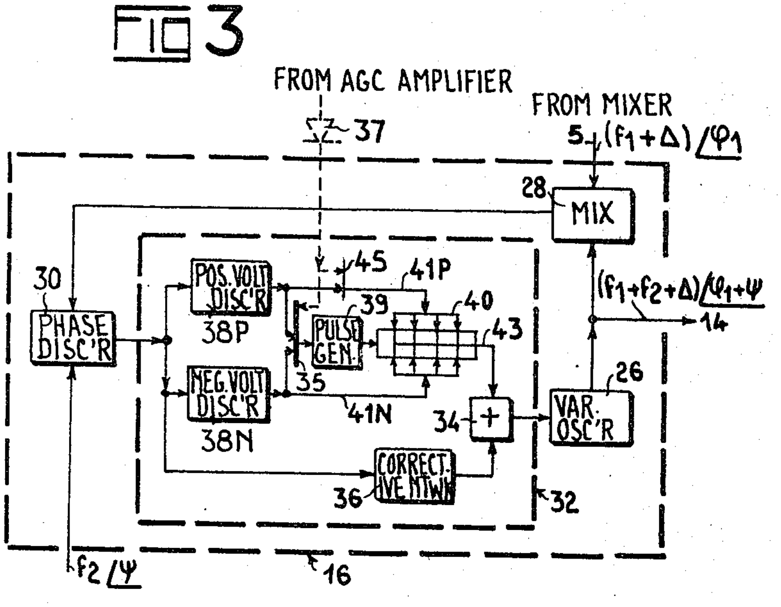
FIG. 3 is a functional diagram of the frequency-spread eliminator circuit forming part of FIG. 2.

The frequency spread eliminator circuit generally designated 16, and one embodiment of which is shown in greater detail in FIG. 3, comprises a variable-frequency oscillator 26 connected in a phase-lock circuit with a mixer 28 receiving at its respective inputs the output of oscillator 26 and the $(f_1+\Delta)\angle\varphi_1$ signal from mixer 5. and with a phase discriminator 30 receiving at its respective inputs the output from mixer 28 and a fixed-frequency fixed-phase reference signal $f_2\angle\psi$ from the common clock generator or synchronizing unit of the system (not shown), the output from phase discriminator 30 being applied to the frequency-controlling input of oscillator 26 by way of a feedback network generally designated 32. With this general arrangement, it is evident that in the steady-state, with a zero phase error voltage delivered by phase discriminator 30, the variable oscillator 26 will be controlled so as to deliver an output having substantially the desired characteristics $(f_1+f_2+\Delta)\underline{/\varphi_1+\varphi}$. As shown, the feedback connection 32 is of a special construction designed to minimize phase error and maintain the frequency deviations of oscillator 26 at all times at a minimum. This construction is disclosed in detail in co-pending application Ser. No. 550,452 filed May 16, 1966, and will but briefly be described here. The feedback loop 32 is of a composite analog/digital type, including an analog channel and a digital channel in parallel, the two channels being combined in an adder circuit 34 at the frequency varying input of oscillator 26. The analog feedback channel includes a conventional corrective network, such as a simple RC integral network. The digital feedback channel includes a positive and a negative voltage discriminators 38P and 38N, having their inputs connected in parallel to the output of phase discriminator 30. Positive voltage discriminator 38P produces a fixed output voltage on occurrence of a positive error voltage greater than a prescribed threshold level at the output of phase discriminator 30, and negative voltage discriminator 38N produces a fixed output voltage on occurrence of a negative error voltage greater in absolute value than a prescribed threshold level at the output of phase discriminator 30. An output voltage when produced by either of the voltage discriminators 38P or 38N is applied by way of an OR-gate 35 to a pulse generator 39, which thereupon initiates the application of a train of sharp pulses at a fixed repetition rate, to the input of a reversible counter 40. Counter 40 is a multistage scale-of-two counter which is provided with inter-stage logic (not here shown), such that on energization of one of two control lines, 41P, the counter counts in one sense, e.g. up, while on energization of the other control line, 41N, the counter counts in the opposite sense, i.e. down. The control lines 41P and 41N are connected to the outputs of voltage discriminators 38P and 38N respectively. The reversible counter 40 has an output line 43 which is connected in parallel to all of the stage outputs of the counter by way of respective resistors, not shown, whose values are substantially in a geometric progression of ratio ½. With this arrangement, as shown in the said copending application, assuming control line 41P is continuously energized the output line 43 will produce a voltage waveform of staircase-like shape increasing stepwise in one sense, say positively as shown in FIG. 3A, whereas if control line 41N remains continuously energized the counter output line 43 will produce a staircase-like output waveform increasing stepwise in the opposite sense, here negatively as shown in FIG. 3B. When the control lines 41P and 41N are alternately energized and deenergized with the reversible variations of the error voltage from phase discriminator 30, the counter output line 43 produces an incrementally varying waveform, having a typical appearance as shown in FIG. 3C.

Figure 3D:
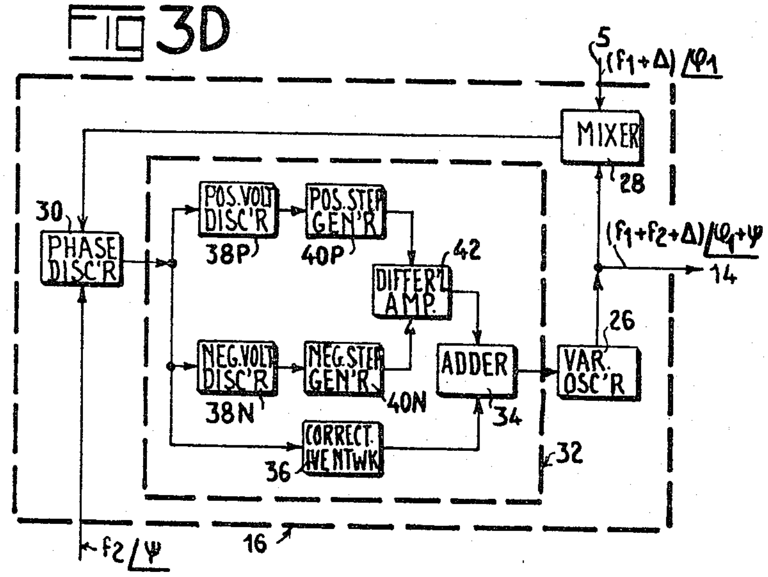
FIG. 3D shows a modification of the circuit of FIG. 3.
Figure 3A:
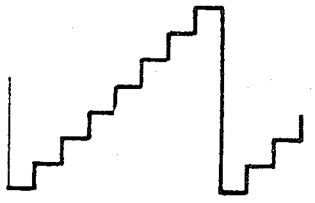
FIGS. 3A, 3B and 3C are waveform diagrams relating to FIG. 3.
Figure 3B:
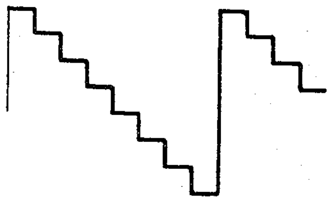
Figure 3C:
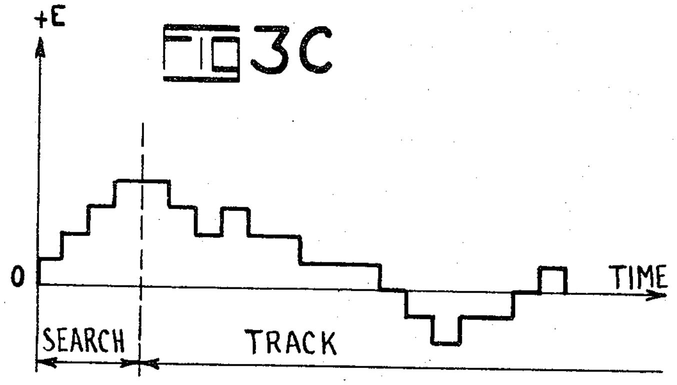

FIG. 3D illustrates a modification of the system of FIG. 3, wherein the reversible counter 40 is replaced by two unidirectional staircase generators 40P and 40N, respectively supplied from the voltage discriminators 38P and 38N. The outputs of the two generators are applied to the respective inputs of a differential amplifier 42, in which said outputs are algebraically added to one another. The general operation is, clearly, the same as that described with reference to FIG. 3.

The incrementally varying output from reversible counter 40, or differential amplifier 42, is combined in adder 34 with the continuously varying voltage from corrective network 36 to maintain at a minimum the phase deviations of oscillator 26 from the true phase condition $(\varphi+\psi)$ required for the output signal.

The over-all operation of the circuit of FIG. 3 is simple. The feedback loop 32 operates to maintain the error output from phase discriminator 30 at zero, at which time the output from mixer 28 must equal the reference signal $f_2\angle\psi$ both in frequency and phase, and the output of oscillator 26 must, consequently, be of the form $$(f_1+f_2+\Delta)\underline{/\varphi_1+\psi}$$

Since this output contains the frequency spread Δ, application of said oscillator output to mixer 14 (FIG. 2) will eliminate said frequency spread from both component signals passed through the single channel of the system. As the output of mixer 14, the component signals will have assumed the forms $f_2\angle\psi$ and $(f_2-2\delta f)\underline{/\theta+\psi}$. While still presenting the same mutual phase displacement $\theta$ equal to that of the original received signals, the two signals now have strictly fixed frequencies, instead of frequencies that are affected by the erratic frequency shift Δ as would be the case in the absence of the frequency spread elimination device of the invention.

As to the detailed operation of the circuit 16 here shown and used in the preferred embodiment of the invention, the composite analog/digital feedback network 32 serves to maintain at all times, during steady-state tracking conditions, the frequency deviations of oscillator 26 from the correct frequency, at values less than a prescribed small increment determined by the threshold voltage of voltage discriminators 38P, 38N. This type of operation has the important advantage of preventing the occurrence of situations, frequently arising in conventional phase-lock circuits, in which the instantaneous frequency deviation of the variable oscillator may momentarily become so large that the circuit will lock in on a spurious noise signal and lose track of the useful signal. Another important advantage of the composite analog/digital feedback loop used in the frequency-spread elimination 16, is that it greatly facilitates target-searching operations. Means described in detail in the above identified co-pending aplication are provided for initially, in the absence of an error signal from phase discriminator 30, operating the generator 40 or one of the generators 40P, 40N, so as to generate a staircase output waveform increasing in a constant sense (such as the rising waveform of FIG. 3A), until such time as mixer 28 produces an output signal and phase discriminator 30 consequently produces a measurable error voltage. At this time a useful signal is present indicating that the target has been acquired, and the circuit is automatically switched to its normal operating mode for continuously tracking the target. In the exemplary time chart of FIG. 3C, the "search" and "track" periods have been shown.

Means for automatically ensuring the desired initial search mode of operation and switching to the tracking mode on acquisition of a target, are disclosed in detail in the above-identified co-pending application. Such means are here indicated in dotted lines in FIG. 3 as including a rectifier diode 37 having one side connected to the output of an amplifier of the system (such as amplifier 3, FIG. 2) provided with a conventional AGC circuit not shown, and its other side connected to a third input of the afore-mentioned OR-gate 35, as well as to one input of an OR-gate 45 having the output of one of the voltage discriminators, here positive voltage discriminator 38P, as the other input thereof, the output of OR-gate 45 being delivered to positive control line 41P. As explained in the co-pending application, in the absence of a useful signal at the input of the AGC circuit diode 37 conducts due to the high noise level then present, and generator 40 is then controlled to produce the upgoing staircase wave of FIG. 3A. On acquisition of a useful signal, diode 37 becomes non-conductive and the normal bidirectional operation earlier described then obtains.

It is to be noted that the output of the frequency spread eliminator or circuit 16 may if desired be used to derive a signal indicative of the target's radial velocity $V_r$, as indicated by the output connection 17 in FIG. 2.

Figure 4A:
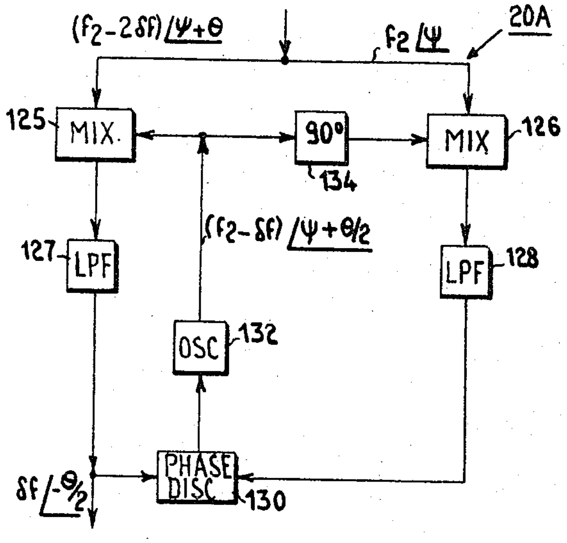
FIGS. 4A and 4B illustrate two modifications of so-called "fictive carrier" demodulators either of which may be used in the system of FIG. 2.

The detector or demodulator circuit generally designated 20 in FIG. 2 is shown in FIG. 4A as comprising two parallel channels each including a mixer 125 and 126 followed by a low-pass filter 127 and 128, and a phase discriminator circuit 130 having the filter outputs applied to its inputs. The output of circuit 130 is applied to the frequency controlling input of a variable oscillator 132 whose output is applied to the second input of mixer 125 directly and is applied to the second output of mixer 126 by way of a 90° phase shifter 134.

It will be understood that with this arrangement, the output frequency of oscillator 132 is stabilized at a value equal to the arithmetic mean or mid-frequency of the two signals applied to the circuit, i.e. at the frequency $(f_2-\delta f)$, and that its phase approximates the arithmetic mean of the phases of said input signals, i.e. $(\psi+\theta/2)$, as shown in the figure. Hence, the output signal from filter 127 is seen to be of the form $\delta f\underline{/-\theta/2}$, and can be used as the demodulated signal that is applied to the phase comparison circuit 24 (FIG. 2).

It is noted that the output frequency of oscillator 132, which serves to demodulate the two component signals, corresponds in frequency and phase to those of a carrier wave which, if modulated in amplitude, would have the two component signals $f_2\angle\psi$ and $(f_2-2\delta f)\underline{/\psi+\theta}$ as its sidebands. A "fictive-carrier" demodulating circuit of this kind is described in fuller detail in French Patent 1,283,-376. It is there shown that the error present between the phase of the output of oscillator 132 and its true ("fictive carrier phase") value, does not affect the frequency or phase of the output signals from filters 127, 128, but only their amplitude. It is also shown that the output signal of the system is unaffected by variations in the amplitude of the input signals, provided said amplitude has a zero mean value. Hence, the circuit will operate correctly in cases where the signals received from the satellite or other target serve to convey intelligence, such as telemetering information or communications, in addition to their use for direction-finding and target-tracking purposes.

The use of the fictive-carrier demodulation technique in demodulating the signals in a radio-interferometer system according to the invention, and the important advantages obtained thereby, is only made possible because the frequencies of said signals have first been stabilized at strictly constant values by means of the frequency-spread elimination device earlier described.

Figure 4B:
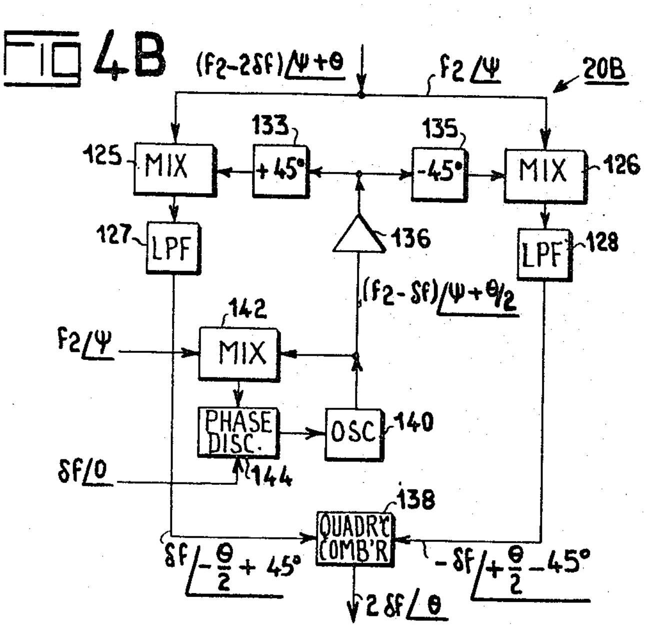

FIG. 4B shows a modification of the demodulating circuit shown in FIG. 4A, the differences involving chiefly the means by which the "fictive carrier" demodulating signal is generated.

In FIG. 4B, the mixers 125 and 126 have their second inputs supplied symmetrically, by way of +45° and −45° phase shifters 133 and 135 respectively, from an amplifier 136 supplied from a variable frequency oscillator 140. The symmetrical outputs from the filters 127 and 128 are of the form $$\delta f \underline{/ -\frac{\theta}{2} + 45°}$$

and $$\delta f \underline{/ +\frac{\theta}{2} - 45°}$$

respectively. They are applied to the two inputs of a conventional combining circuit 138 of the so-called quadratic combiner type which operates to produce an output voltage proportional to the sum of the squared input voltages. Circuits of this type are well-known in the art. The output signal from quadratic combiner 138 is of the form $2\delta f \angle \theta$, and can serve as the output signal applied to comparator circuit 24 (FIG. 2). The output frequency of oscillator 140 is controlled by means of a phase-lock circuit including a mixer 142 receiving on one side the oscillator output and on the other side a fixed signal $f_2 \angle \psi$ from the synchronizing source, not shown. The mixer output is applied to one side of a phase discriminator 144 which receives at its other side a fixed signal $\delta f \angle 0$. The discriminator 144 produces an error signal which serves to stabilize the output frequency and phase of oscillator 140 substantially at the values $$(f_2 - \delta f) \underline{/ \psi + \theta/2}$$

The outputs of filters 127 and 128, of the forms $$\delta f \underline{/ -\frac{\theta}{2} + 45°}$$

and $$-\delta f \underline{/ +\frac{\theta}{2} + 45°}$$

respectively, are applied to the two inputs of quadratic combiner 138 which produces an output signal of the form $2\delta f \angle \theta$.

The advantages of using a quadratic combiner in the embodiment of FIG. 4B is that it eliminates any errors due to imprecise phasing of the locally generated frequencies $f_2$ and $\delta f$.

The demodulator circuit 20 constructed as described with reference to FIG. 4A or FIG. 4B make it possible to obtain the benefits of carrier demodulation without the complication of having to derive said carrier from the transmitted signals themselves. In order to obtain a signal having the mid-phase of the received signals, there would normally have to be provided an auxiliary antenna positioned centrally of the square array defined by the two pairs of antennas such as 1 and 2. This is a serious nuisance, especially because the location at the accurate center of the square antenna array in satellite tracking installations is desirably occupied by a visual observation post serving for synchronizing operations.

Figure 5:
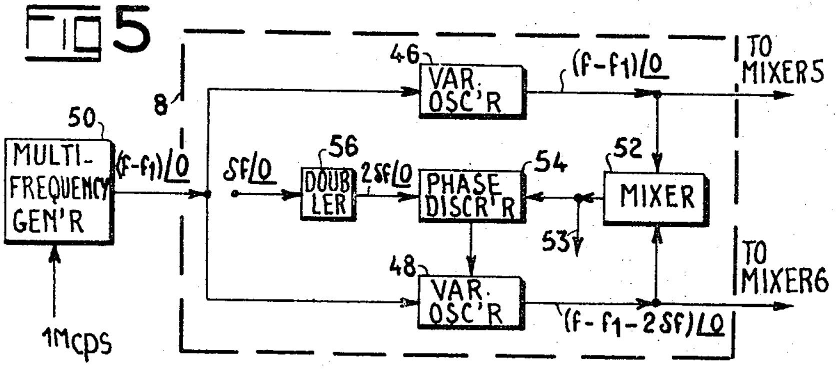
FIG. 5 is a functional diagram of the differential heterodyning circuit used in FIG. 2.

The differential heterodyning circuit generally designated 8 in FIG. 2 is shown in FIG. 5 as comprising the pair of oscillators 46 and 48 both piloted from a common multi-channel standard frequency generator set 50. The latter is driven by a megacycle pulse train from the common clock or synchronizing unit (not shown) and includes 2000 different frequency channels, selectable in 1000 c.p.s. increments. Such a multi-frequency source is convenient to use in order to allow of readily changing from one frequency to another, as when discontinuing the tracking of one satellite and beginning the tracking of a different satellite. It will be apparent however that other suitable frequency sources may be used.

If desired the $(f-f_1) \angle 0$ output from multi-channel generator 50 may include an approximate, fixed, correction for estimated Doppler shift, though this is not essential.

As here shown, oscillators 46 and 48 have their frequency piloting inputs connected to an output of multi-channel generator set 50 so selected as to produce the desired signal $(f-f_1) \angle 0$. Oscillator 48 further has a frequency varying input connected to introduce a constant frequency displacement of $2\delta f$ into the output of oscillator 48 with respect to that of oscillator 46. For this purpose the outputs of both oscillators are applied to a mixer 52 and the mixed output is applied to one side of a phase discriminator 54. The other side of the discriminator is connected to the output of a frequency doubler 56 which is fed with a signal $\delta f \angle 0$ from the previously mentioned clock generator (not shown). Thus, discriminator 54 produces an error signal representing the departure, from the desired difference value $2\delta f$, of the difference between the output frequencies of both oscillators 46 and 48. In the steady state, both inputs to discriminator 54 are the equal signals $2\delta f \angle 0$.

Figure 6:
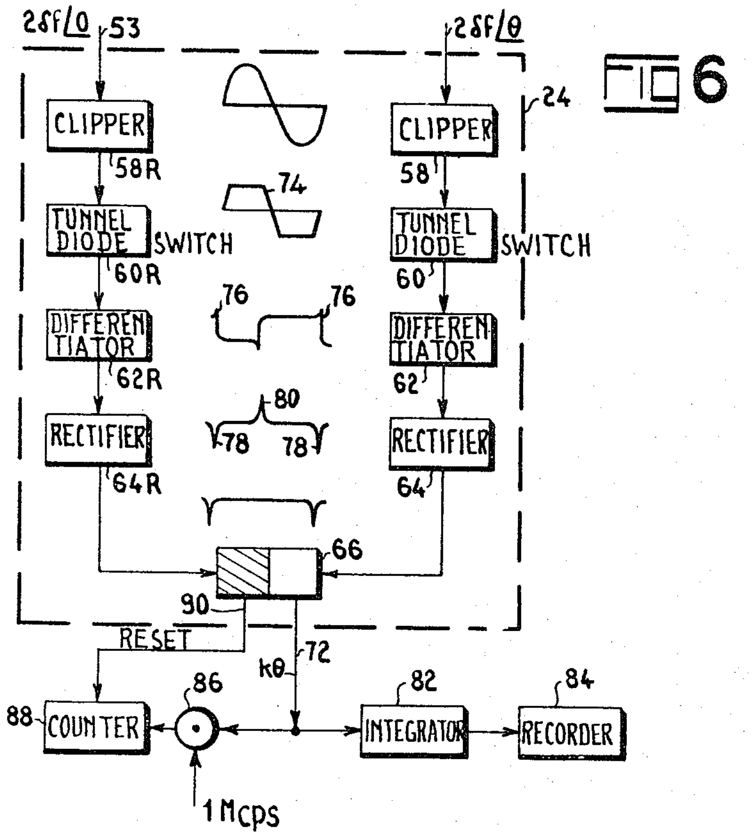
FIG. 6 is a functional diagram of a phase comparator circuit forming part of the system.

The phase comparison circuit generally designated 24 in FIG. 2 is of a type disclosed in detail and claimed in copending application Ser. No. 14,011 filed Apr. 21, 1965. The circuit is shown in FIG. 6 as comprising two parallel channels, one of which receives the signal $2\delta f \angle \theta$ from phase demodulator circuit 20, and the other of which receives the reference signal $2\delta f \angle 0$, this latter signal being conveniently tapped from the output of mixer 52 (FIG. 5) as indicated by the branch line 53 in both FIGS. 5 and 6. Each of the parallel channels of phase comparator circuit 24 comprises, in series, a clipper stage, a tunnel diode switching stage, a differentiating stage, and a suppressor rectifier stage. The four stages are respectively designated 58, 60, 62 and 64, with the stages of the reference channel being followed by the letter R. The outputs of the two channels are applied to the set and reset inputs of a bistable circuit or flip-flop 66.

The signals applied to the inputs of the respective clipper stages 58 and 58R are sinewave signals of equal frequency $(2\delta f)$, and of a phase displaced by a phase angle $\theta$ which is the quantity to be determined. Each of the clipper stages 58, 58R consists of a conventional arrangement of reversely poled diodes which operate in a well-known manner to bypass those portions of both the positive and negative semi-cycles of the signals applied thereto which exceed in voltage a prescribed maximum value, thereby producing the flat-topped waveforms indicated at 74 in FIG. 6. The clipped signals are applied to the tunnel diode switching stages 60 and 60R, each of which comprises a tunnel diode forward-biased to a potential just short of the peak voltage of the tunnel diode characteristic. With this arrangement, one, say the positive-going or leading, edge of each cycle of the clipped signal/waveform causes the associated tunnel diode to switch to its low conductance state an extremely short, and strictly constant, time interval after the application of said leading edge to the tunnel diode. Thereafter the tunnel diode switches back to its initial high-conductance state at an instant that is less precisely timed. As a result of this operation the tunnel diode stages 60 and 60R produce waveforms of the generally castellated shape indicated, wherein the falling edges such as 76 are precisely timed in respect to the leading edges of the original sinewave signals. When the castellated waveforms are passed through the differentiator stages 62 and 62R, which are conventional RC differentiating networks, there are produced differentiated voltage peaks of alternating polarity, as indicated. All of the peaks such as 78 of one polarity, arising from differentiation of the falling edges 76 of the tunnel diode output waveforms, are precisely timed in respect to the leading edges of the associated sinewave input signals. The differential voltage peaks are passed through the suppressor stages 64 and 64R which comprise simple rectifier diodes poled so as to pass the precisely-timed voltage peaks 78 of one polarity while suppressing the randomly timed peaks 80 of the other polarity.

Figure 7:
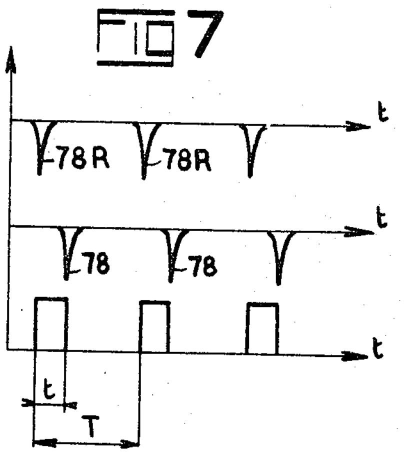
FIG. 7 is a waveform diagram relating to the circuit of FIG. 6.

The single-polarity voltage peaks from suppressor stages 64 and 64R, on being applied to the respective set and reset inputs of bistable circuit 66, cause this circuit to switch alternately to its set and reset states, so that the circuit 66 remains in one of its states, during each cycle period of the input frequency $2\delta f$, for a time period exactly corresponding to the phase displacement $\theta$ of the input signals. This is clearly apparent from FIG. 7 where the uppermost line shows the differentiated single-polarity pulses 78R passed by differentiator stage 64R of the reference channel, and the middle line shows the differentiated single-polarity pulses 78 passed by the differentiator stage 64 of the measuring channel. The lowermost line of FIG. 7 indicates the square pulseforms generated by output line 72 connected to one side of flip-flop 66. It will be evident that the cycle period T of said square output pulses corresponds to the cycle period of the signal frequency $2\delta f$, while the width $t$ of each square pulse is an accurate measure of the instantaneous phase displacement $\theta$; specifically, $$\theta=2\pi\frac{t}{T}$$

A more detailed description of the phase comparison circuit 24 will be found in the aforesaid copending application.

The output pulses on line 72 may be exploited in various ways. As shown, output line 72 is connected to an integrator 82, such as a conventional RC voltage integrator network, producing a voltage proportional to the time integral of the elementary voltages of the rectangular output pulses from flip-flop 66. The output of integrator 82 may be applied to a recorder 84 to indicate the variations of the phase displacement $\theta$ and plot the motion of the target in accordance therewith.

The output line 72 is also shown connected to one input of a coincidence gate 86, receiving at its second input microsecond clock pulses from the synchronizing unit of the system. The output of gate 86 is shown applied to a digital counter 88 having a reset input connected to the second, or reset, output line 90 of flipflop 66. Gate 86 is thus opened for the duration of each rectangular pulse produced by the set output 72 of the flipflop 66, to apply 1-microsecond clock pulses to counter 88, and cause the counter to count the number of microsecond pulses as a measure of the phase displacement $\theta$.

The system disclosed permits of extreme precision in the measurements of phase displacement and hence target direction. Thus, the digital counter output arrangement just described makes it possible to measure the phase angle $\theta$ with a relative error not exceeding 0.1%.

Figure 8:
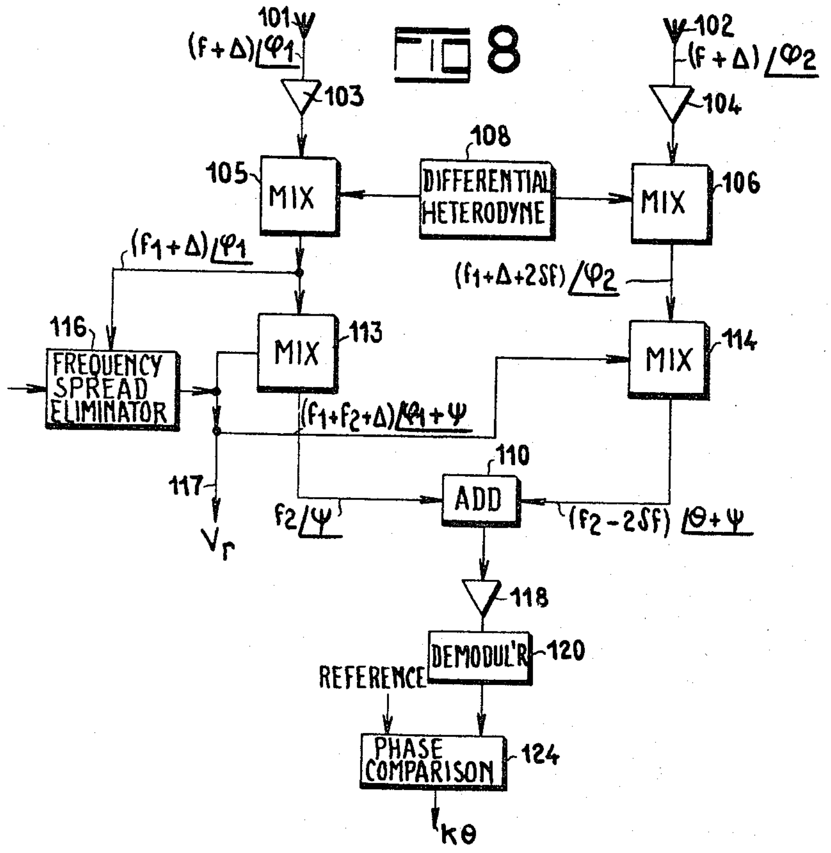
FIG. 8 is a functional diagram similar to FIG. 2 but illustrating a modified form of radio-interferometer system according to the invention.

Various modifications may be introduced into the system disclosed herein without departing from the scope of the invention. The modifications may involve both the construction of the component circuits and the layout of the system as a whole. As one example of this latter class of modifications, FIG. 8 illustrates a system generally similar to that of FIG. 2, but wherein the frequency spread elimination step is carried out ahead of the addition stage of the component input signals rather than beyond said addition stage as in FIG. 2. Components in FIG. 8 that may be similar to or identical with components of FIG. 2 are designated by the same reference numbers plus 100, and only the differences will be described.

The signals issuing from mixers 105 and 106 in which the first frequency conversion or differential heterodyning step was performed in a manner similar to FIG. 2, are applied to the first inputs of respective mixers 113 and 114. The outputs of the mixers are applied to adding circuit 110 and the output of the adder, after amplification in amplifier 118, is applied to the phase demodulator 120.

The second inputs of mixers 113 and 114 are supplied in parallel with the output of the frequency spread eliminator circuit 116. The output of circuit 116 is a signal of the form $(f_1+f_2+\Delta)/\underline{\varphi_1+\psi}$. Thus, the outputs of mixers 113 and 114 are respective signals $f_2\angle\psi$ and $(f_2-2\delta f)\angle\theta+\psi$. After addition in circuit 110, the composite signal is composed of the same component signals as is the composite signal at the output of mixer 14 in FIG. 2, and is subsequently processed in the manner described in connection with that figure.

In the ensuing claims, the expression "angle lock" is to be interpreted with its usually accepted meaning as generic to phase lock and frequency lock.

What I claim is:

1. A signal receiving system comprising in combination:

- means receiving two signals of common nominal carrier frequency and subject to erratic frequency shift;
- means differentially heterodyning said signals so as to impart respective frequencies thereto differing by a small fixed frequency value from each other;
- a common amplifier channel connected to receive both differentially heterodyned signals and producing heterodyned signals as components;
- demodulating means connected to receive the composite signal and separately demodulate the components thereof; and
- frequency spread eliminating means comprising:
  - a variable-frequency oscillator having a frequency varying input;
  - mixer means having respective inputs connected to receive one of said differentially heterodyned signals and the output of said variable oscillator;
  - a phase discriminator connected to receive the output of said mixer means at one input and a reference signal at its second input and delivering an error signal at an output thereof; and
  - a feedback loop connecting the output of said discriminator with the frequency-varying input of said variable oscillator; and
  - further mixer means connected in the signal path ahead of said demodulating means and connected to receive the output of said variable oscillator whereby to eliminate said erratic frequency shift prior to demodulation of said composite signal components.

2. The system defined in claim 1, wherein said feedback loop includes digital means having an input connected to the phase discriminator output and producing an incremental variation in output in one sense in response to an error signal of one sense greater than a prescribed level, and producing an incremental variation in output of opopsite sense in response to an error signal of the opposite sense greater than a prescribed level, and means applying the output of said digital means to said frequency-varying input of the variable oscillator.

3. The system defined in claim 2, wherein said feedback loop further comprises a corrective network connected in parallel with said digital means between the phase discriminator output and said frequency-varying input of the oscillator.

4. The system defined in claim 2, including means selectively responsive to the received signal for controlling the digital means to produce incremental output variations in a single one of said two senses.

5. The system defined in claim 2, wherein said digital means comprises:

two voltage discriminators having inputs connected to the phase discriminator output and producing respective output signals in response to error signals of positive and negative polarity exceeding a prescribed threshold level, digital generator means connected for producing a staircase-like voltage waveform on occurrence of an output signal from either of said voltage discriminators, and logical circuit means connected to control the generator means to sense on occurrence of an output signal from one voltage discriminator and increase in opposite sense on occurrence of an output signal from the other voltage discriminator.

6. A system for measuring the phase displacement between two received signals of common nominal carrier frequency and subject to erratic frequency shift, comprising:

means differentially heterodyning said received signals so as to impart respective frequencies thereto differing by a small fixed frequency value from each other;

a common amplifier channel connected to receive both differentially heterodyned signals and producing a composite signal having the amplified differentially heterodyned signals as components;

demodulating means connected to receive the composite signal and separately demodulate the components thereof whereby to derive a demodulated signal corresponding in frequency to said difference frequency value and having a phase condition corresponding to said phase displacement to be measured;

a phase comparison circuit having inputs connected to receive said demodulated signal and a reference phase signal whereby to produce an output signal indicative of said phase displacement;

and frequency spread eliminating means comprising:

a variable-frequency oscillator having a varying input;

an angle-lock circuit connected to receive a signal including said erratic frequency shift and connected in a feedback loop with said frequency varying input, whereby the oscillator will deliver a signal having a component that is locked in frequency and phase with said erratic frequency shift, and mixer means connected in the signal path ahead of said demodulating means and connected to receive the output of said variable oscillator whereby to eliminate said erratic frequency shift prior to demodulation of said composite signal components.

7. A system for measuring a phase displacement between two received signals of common nominal carrier frequency and subject to erratic frequency shift, comprising:

means differentially heterodyning said signals so as to impart respective frequencies thereto differing by a small fixed frequency value from each other;

a common amplifier channel connected to receive both differentially heterodyned signals and producing a composite signal having the amplified differentially heterodyned signals as components;

frequency spread-eliminating means including mixer means having a first input and an output interposed in the signal path and means applying to the second input of the mixer means a signal including said erratic frequency shift whereby to eliminate said erratic shift from the signal path;

demodulating means connected to receive the composite channel free from said erratic frequency shift said demodulating means comprising:

two parallel demodulating channels each including a mixer receiving said composite signal at a first input;

means generating a demodulating signal having a frequency the arithmetic mean of the frequencies of the components of said composite signal and having a phase condition substantially the arithmetic mean of the phase conditions of said components;

means including phase shifter means for applying said demodulating signal in phase quadrature relation to second inputs of said respective mixers;

means filtering the outputs of said mixers;

means combining said filtered outputs, including means connected to at least one of said filtered outputs for deriving a demodulated signal having a frequency proportional to said fixed difference frequency value and a phase proportional to said phase displacement; and a phase comparison circuit having a first input connected to receive said demodulated signal and a second input connected to receive a fixed-phase reference signal of equal frequency to that of said demodulated signal, and having an output delivering a signal indicative of said phase displacement to be measured.

8. The system defined in claim 7, wherein said combining means comprises a phase discriminator having respective inputs connected to receive said filtered outputs and having an output delivering an error signal, and said demodulating signal developing means comprises a variable-frequency oscillator having a frequency-varying input connected to receive said error signal and having an output delivering said demodulating signal, and wherein said demodulated signal deriving means is connected to one of said filtered outputs.

9. The system defined in claim 7, wherein said demodulating signal developing means comprises an oscillator producing a signal at said frequency having the arithmetic mean of said component frequencies, and said combining means comprises quadratic adder means having inputs connected to receive said filtered outputs and having an output delivering a signal proportional to the sum of said filtered outputs squared, and said demodulated signal is derived from an output of said quadratic adder means.

10. The system defined in claim 7, wherein said phase comparison circuit comprises two signal channels each including a clipper stage, a tunnel diode switching stage, a differentiating stage, and a suppressor rectifier stage, one of said channels being connected to receive said demodulated signal and the other channel connected to receive said reference signal, a bistable circuit having inputs connected to the outputs of said respective channels, and means connected to an output of the bistable circuit for producing a signal indicative of said phase displacement.

(References on following page)

References Cited

UNITED STATES PATENTS

| | | | |
|---|---|---|---|
| 2,589,236 | 3/1952 | Earp | 324—85 |
| 2,951,152 | 8/1960 | Sichak et al. | 343—117 |
| 2,975,275 | 3/1961 | Adams | 343—117 |
| 2,995,750 | 8/1961 | Holcomb et al. | 343—113 |
| 3,036,210 | 5/1962 | Lehan et al. | 343—113 |
| 3,048,782 | 8/1962 | Altman | 343—117 |
| 3,251,062 | 5/1966 | Ghose | 343—117 |

RODNEY D. BENNETT, *Primary Examiner.*

J. G. BAXTER, *Assistant Examiner.*